United States Patent
Erhart et al.

(10) Patent No.: US 8,233,610 B2
(45) Date of Patent: Jul. 31, 2012

(54) ASSISTING CONTACT CENTER AGENTS AND CUSTOMERS

(75) Inventors: George William Erhart, Loveland, CO (US); Valentine C. Matula, Granville, OH (US); David Joseph Skiba, Golden, CO (US); Lawrence O'Gorman, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 677 days.

(21) Appl. No.: 12/475,201

(22) Filed: May 29, 2009

(65) Prior Publication Data

US 2010/0303224 A1 Dec. 2, 2010

(51) Int. Cl.
*H04M 3/00* (2006.01)
*H04M 5/00* (2006.01)

(52) U.S. Cl. .......... 379/265.09; 379/265.05; 379/265.06

(58) Field of Classification Search ............. 379/265.09, 379/265.01, 265.05, 265.06, 212.01, 211.02, 379/265.03
See application file for complete search history.

(56) References Cited

U.S. PATENT DOCUMENTS

2004/0062363 A1* 4/2004 Shambaugh et al. ...... 379/88.01
2008/0232575 A1* 9/2008 Gumbula ................. 379/265.11

* cited by examiner

*Primary Examiner* — Thjuan K Addy

(57) ABSTRACT

A method of receiving a call from a first caller that is requesting for assistance with a product. Once the call center receives the call, a call-processing switch routes the first caller to a first agent. Once the caller is routed to the first agent, a first message is transmitted to both the first caller's terminal and the first agent's terminal. After the first message is presented to the first caller and the first agent, the call-processing switch will monitor the communications stream for distress. During monitoring of the communications stream, the call-processing switch will estimate whether a level of distress is present in the communications stream. If it is estimated by the call-processing switch that there is distress present in the communications stream, the call-processing switch will transmit a second message to the first caller's terminal and the first agent's terminal.

20 Claims, 8 Drawing Sheets

ASSISTING CONTACT CENTER AGENTS AND CUSTOMERS

FIELD OF THE INVENTION

The present invention relates to telecommunications in general, and, more particularly, to telecommunications call centers.

BACKGROUND OF THE INVENTION

In many situations, when a product is purchased, the product can be too difficult for the average person to assemble, operate or troubleshoot. These problems could be resolved by contacting a call center agent for assistance.

Once the caller is connected to a call center agent, the caller is able to ask questions pertaining to their problem with the product. However, in many occasions, the call center agent must reference an electronic manual to pinpoint a solution to the problem. This situation occurs, for example, when the call center agent:
  i. does not remember the solution to the problem, or
  ii. is not familiar with the problem, or
  iii. desires to verify his/her proposed solution before presenting it to the caller, or
  iv. any combination of i, ii, and iii.

In this example, the caller becomes angry, annoyed, frustrated, etc., since he/she is being put-on-hold for an extended period of time until the call center agent is able to pinpoint the solution in the electronic manual. On the other hand, the call center agent may also become angry, annoyed, frustrated, etc., since the solution to the caller's problem is not readily apparent to the call center agent.

This poor quality-of-service may result in a loss of potential customers. Furthermore, the call center's expenses may increase due to the fact that additional training is necessary to update an agent's knowledge in a particular topic.

Therefore, there exists a need for a more accommodating call center that can assist callers with quick and reliable product information.

SUMMARY OF THE INVENTION

The present invention provides a call center that avoids some of the costs and disadvantages associated with call centers in the prior art.

In accordance with the illustrative embodiment, a call center receives a call from a first caller that is requesting for assistance with a product. Once the call center receives the call, a call-processing switch routes the first caller to a first agent.

Once the caller is routed to the first agent, a first message is transmitted to both the first caller's terminal and the first agent's terminal. After the first message is presented to the first caller and the first agent, the call-processing switch will monitor the communications stream for distress. During monitoring of the communications stream, the call-processing switch will estimate whether a level of distress is present in the communications stream. If it is estimated by the call-processing switch that there is distress present in the communications stream, the call-processing switch will transmit a second message to the first caller's terminal and the first agent's terminal.

After the second message is presented to the first caller and the first agent, the call-processing switch will again monitor the communications stream for distress. During monitoring of the communications stream, the call-processing switch will estimate whether a level of distress is present in the communications stream.

If there is no distress present in the communications stream, the call-processing switch will build a model based, at least in part, on the effectiveness of the first message and the second message in alleviating the distress of first caller and the first agent. This model will be used in future calls to assist the call-processing switch in choosing which messages to display to a caller and an agent in analogous circumstances.

When a second agent is presented with analogous circumstances with a second caller, the call-processing switch will transmit the first message and the second message to the second caller's terminal and the second agent's terminal. The messages will be transmitted in an order based, at least in part, on the first level of distress and the second level of distress.

The illustrative embodiment of the present invention comprises:
(i) receiving a communication stream from a first caller $C_1$ for a first agent $A_1$, (ii) transmitting a first message to the first agent $A_1$, (iii) estimating a first level of distress in the first caller $C_1$ after the first message is presented to the first agent $A_1$ by analyzing the semantic content of the communication stream from the first caller $C_1$ to the first agent $A_1$, (iv) transmitting a second message to the first agent $A_1$, (v) estimating a second level of distress in the first caller $C_1$ after the second message is presented to the first agent $A_1$ by analyzing the semantic content of the communication stream from the first caller $C_1$ for the first agent $A_1$, and (vi) transmitting the first message and the second message to a second agent $A_2$ in an order based, at least in part, on the first level of distress and the second level of distress.

DETAILED DESCRIPTION

Figure 1:
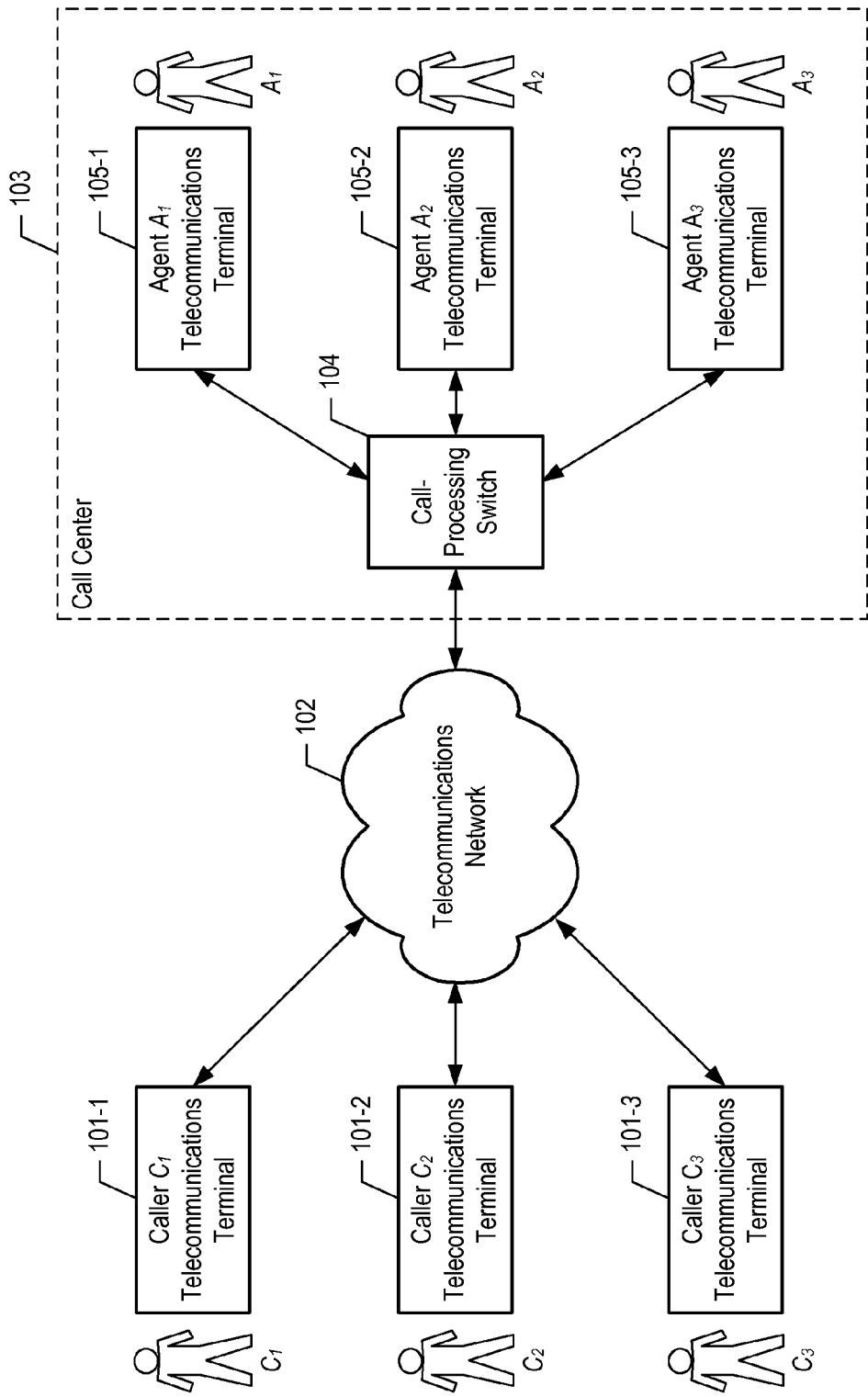
FIG. 1 depicts a schematic diagram of the salient components of telecommunications systems 100 in accordance with the illustrative embodiments of the present invention.

FIG. 1 depicts a schematic diagram of the salient components of telecommunications systems 100 in accordance with the illustrative embodiment of the present invention.

Telecommunications communications systems comprises: caller telecommunications terminals 101-1 through 101-3, telecommunications network 102, and call center 103, which comprises call-processing switch 104, and agent telecommunications terminals 105-1 through 105-3, interconnected as shown.

Although the illustrative embodiment comprises three caller terminals 101-1 through 101-3, it will be clear to those skilled in the art, after reading this disclosure, how to make and use alternative embodiments of the present invention that comprise any number of caller terminals.

Although the illustrative embodiment comprises one telecommunications network 102, it will be clear to those skilled in the art, after reading this disclosure, how to make and use alternative embodiments of the present invention that comprises any number or any combination of telecommunications networks.

Although the illustrative embodiment comprises one call center 103, it will be clear to those skilled in the art, after reading this disclosure, how to make and use alternative embodiments of the present invention that comprises any number of call centers.

Although the illustrative embodiment comprises one call-processing switch 104, it will be clear to those skilled in the art, after reading this disclosure, how to make and use alternative embodiments of the present invention that comprises any number or any combination of call-processing switches.

Although the illustrative embodiment comprises three agent terminals 105-1 through 105-3, it will be clear to those skilled in the art, after reading this disclosure, how to make and use alternative embodiments of the present invention that comprises any number of agent terminals.

Caller $C_i$, wherein $i \in \{1, 2, 3\}$, is a person who desires product information from agent $A_j$, wherein $j \in \{1, 2, 3\}$. In accordance with the illustrative embodiment, one or more callers are able to establish voice calls with call center 103 at the same time.

Caller telecommunications terminal 101-$i$, comprises hardware and software that enables caller $C_i$ to contact and interact with call center 103, in well-known fashion. It will be clear to those skilled in the art, after reading this disclosure, how to make and use alternative embodiments of the present invention in which caller terminal 101-$i$ enables a user to contact call center 103 via a different modality, for example, and without limitation, web requests, e-mail, instant messaging, short-message service, video, etc.

In accordance with the illustrative embodiment, caller terminal 101-$i$ is a wireless terminal (e.g., a cell phone, a personal digital assistant, a smart-phone, etc.), but it will be clear to those skilled in the art, after reading this disclosure, how to make and use alternative embodiments of the present invention in which some or all of the caller terminals connect to telecommunications network 102 via wireline.

Telecommunications network 102 is the Public Switched Telephone Network (PSTN), but it will be clear to those skilled in the art, after reading this disclosure, how to make and use alternative embodiments of the present invention in which telecommunications network 102 is a different network or a combination of different networks, for example, and without limitation, the Internet, a private data network, a satellite network, etc.

Call center 103 is a building for housing call-processing switch 104, agent $A_j$ and agent terminal 105-$j$, in well-known fashion. In accordance with the illustrative embodiment, agent $A_j$ and agent terminal 105-$j$ are co-located with call-processing switch 104 in call center 103, but it will be clear to those skilled in the art, after reading this disclosure, how to make and use alternative embodiments of the present invention in which some or all of the agents and agent terminals are not co-located with call-processing switch 104.

Call-processing switch 104 comprises hardware and software for connecting caller terminal 101-$i$ to agent terminal 105-$j$, monitoring and estimating the communications stream between caller terminal 101-$i$ and agent terminal 105-$j$, transmitting one or more messages to caller terminal 101-$i$ to agent terminal 105-$j$, and building a model of the effectiveness of the one or more transmitted messages. In accordance with the illustrative embodiment, call-processing switch 104 is capable of performing the tasks described below and in the accompanying figures.

Agent terminal 105-$j$ comprises hardware and software that enables an agent to contact and interact with caller terminal 101-$i$, in well-known fashion. It will be clear to those skilled in the art, after reading this disclosure, how to make and use alternative embodiments of the present invention in which an agent $A_j$ associated with agent terminal 105-$j$ contacts caller terminal 101-$i$ via a different modality, for example, and without limitation, e-mail, instant messaging, short-message service, video, etc.

Figure 2:
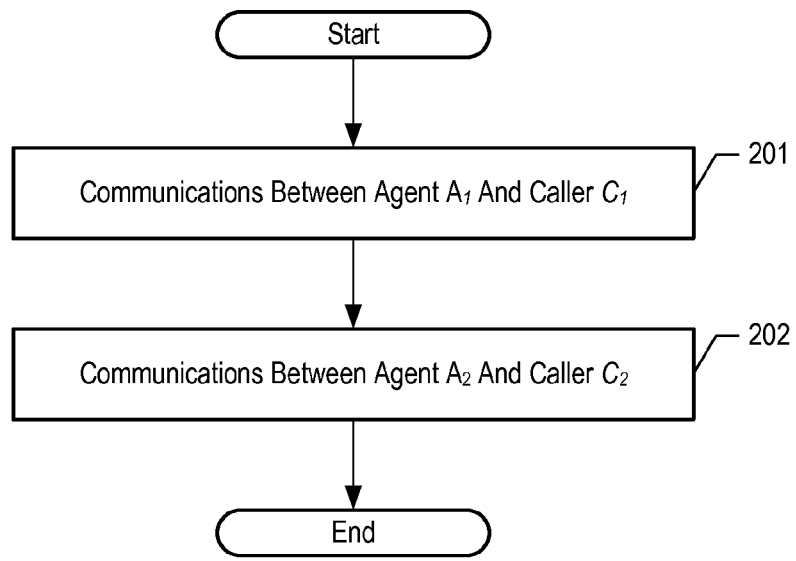
FIG. 2 depicts a flowchart of the salient tasks associated with the operation of the illustrative embodiment of the present invention.

FIG. 2 depicts a flowchart of the salient tasks associated with the operation of the illustrative embodiment of the present invention.

At task 201, caller $C_1$ contacts call center 103 via caller terminal 101-1 to obtain information about a product, in well-known fashion. Call-processing switch 104 is configured to route the call to one of the agent terminals 105-$j$ which, in accordance with the illustrative embodiment, the call is routed to agent terminal 105-1 associated with agent $A_1$. At task 201, call-processing switch 104 receives a communications stream between caller terminal 101-1 and agent terminal 105-1. The call-processing switch 104 transmits one or more messages to caller $C_1$ and agent $A_1$, monitors and estimates whether a distress level is present in the communications stream after transmitting the one or more messages, and builds a model based, at least in part, on the estimated levels of distress. Task 201 will be described in detail below and with respect to FIG. 3.

For the purpose of this specification, a "communications stream" could be:
i. voice, or
ii. text, or
iii. data, or
iv video, or
v. any combination of i, ii, iii, and iv.

For the purpose of this specification, "distress" is defined as:
i. frustration, or
ii. anger, or
iii. annoyance, or
iv. confusion, or
v. anxiety, or
vi. stress, or
vii. nervousness, or
viii. fear, or
ix. any combination of I, ii, iii, iv, v, vi, vii, and viii.

At task 202, caller $C_2$ contacts call center 103 via caller terminal 101-2 to obtain analogous information as caller $C_1$. Call-processing switch 104 is configured to route the call to one of the agent terminals 105-$j$ which, in accordance with the illustrative embodiment, the call is routed to agent terminal 105-2 associated with agent $A_2$. At task 202, call-processing switch 104 receives a communications stream between caller terminal 101-2 and agent terminal 105-2 in which one or more messages are presented to the caller $C_2$ and agent $A_2$ based, at least in part, on the estimated levels of distress i.e., on the model. Task 202 will be described in detail below and with respect to FIG. 3.

Figure 3:
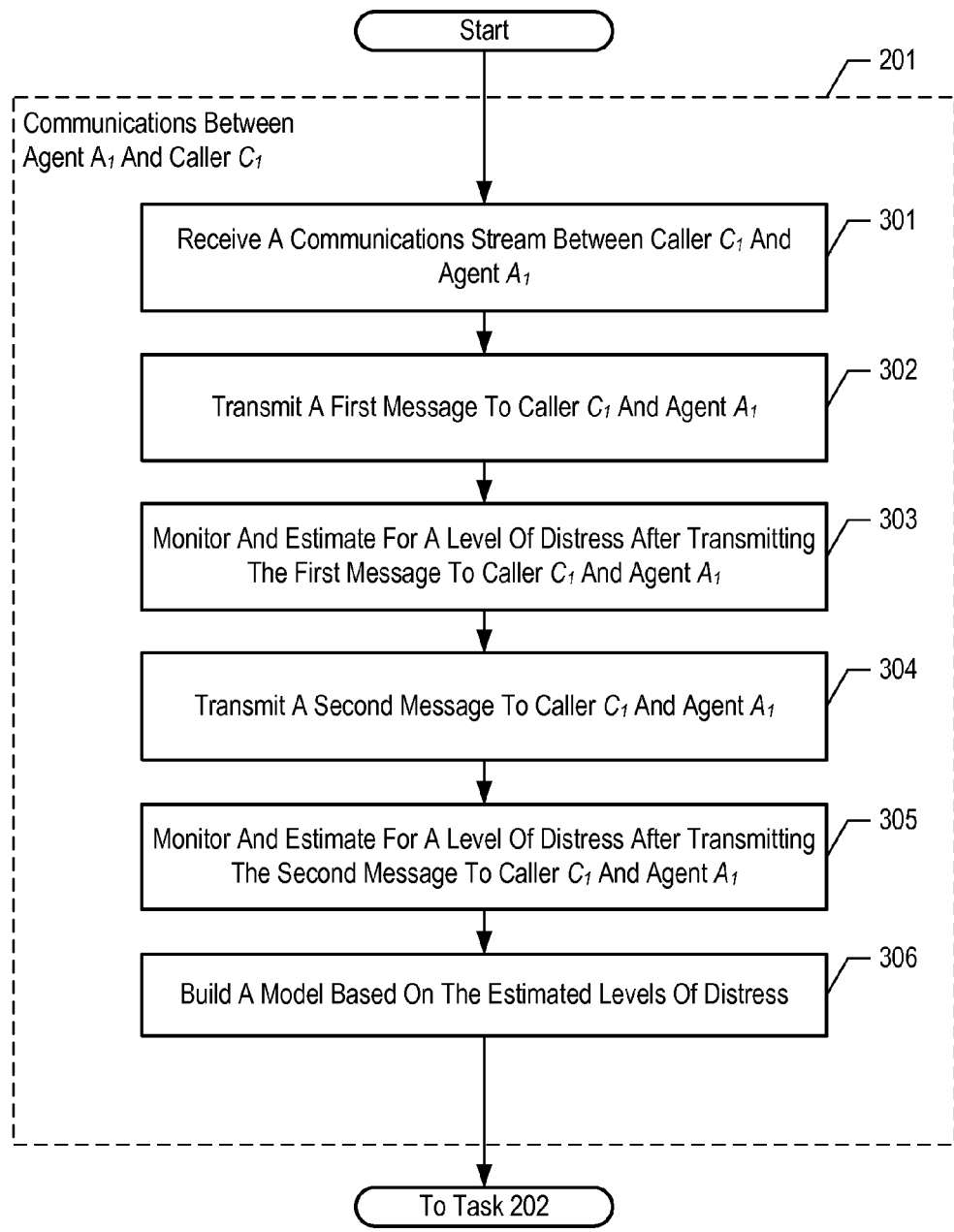
FIG. 3 depicts a flowchart of the salient tasks associated with the operation of task 201 in accordance with the illustrative embodiment of the present invention.

FIG. 3 depicts a flowchart of the salient tasks associated with the operation of task 201 in accordance with the illustrative embodiment of the present invention. It will be clear to those skilled in the art, after reading this disclosure, how to perform the tasks associated with FIG. 3 in a different order than represented or to perform one or more of the tasks concurrently. Furthermore, it will be clear to those skilled in the art, after reading this disclosure, how to make and use alternative embodiments of the present invention that omit one or more of the tasks associated with FIG. 3. Furthermore, all of the tasks 301, 302, 303, 304, 305 and 306 are performed by call-processing switch 104, but it will be clear to those skilled in the art, after reading this disclosure, how to make and use alternative embodiments of the present invention in which some or all of the tasks are performed by:

i. caller terminals 101-$i$, or
 ii. agent terminals 105-$j$, or
 iii. a combination of i and ii.

At task 301, the call-processing switch 104 receives the communications stream between caller $C_1$ and agent $A_1$. In accordance with the illustrative embodiment, caller $C_1$ is contacting agent $A_1$ to obtain assistance with troubleshooting a product. It will be clear to those skilled in the art, after reading this disclosure, how to make and use alternative embodiments of the present invention in which the caller is contacting the agent to obtain other information, for example, and without limitation, financial information, account information, etc. Task 301 will be described in detail below with respect to FIG. 4.

At task 302, the call-processing switch 104 transmits a first message to both caller terminal 101-1 and agent terminal 105-1. It will be clear to those skilled in the art, after reading this disclosure, how to make and use alternative embodiments of the present invention in which the first message is only transmitted to one terminal, for example, either the caller terminal or the agent terminal. Task 302 will be described in detail below with respect to FIG. 5.

At task 303, call-processing switch 104 monitors and estimates whether distress is present in the communications stream between caller $C_1$ and agent $A_1$ after transmitting the first message. In accordance with the illustrative embodiment, call-processing switch 104 will monitor and estimate the communications stream by analyzing the semantic content of both the communications stream received from the caller $C_1$ and the agent $A_1$. It will be clear to those skilled in the art, after reading this disclosure, how to make and use alternative embodiments of the present invention in which the call-processing switch 104 only monitors and estimates a level of distress of one communications stream, for example, either from the caller or the agent. Task 303 will be described in detail below with respect to FIG. 6.

At ask 304, the call-processing switch 104 transmits a second message to caller $C_1$ and agent $A_1$ if distress is present in the communications stream after the first message is presented to the caller and the agent. It will be clear to those skilled in the art, after reading this disclosure, how to make and use alternative embodiments of the present invention in which the second message is only transmitted to one terminal, for example, either the caller terminal or the agent terminal. Task 304 will be described in detail below with respect to FIG. 7.

At task 305, call-processing switch 104 monitors and estimates whether distress is present in the communications stream between caller $C_1$ and agent $A_1$ after transmitting the second message. In accordance with the illustrative embodiment, call-processing switch 104 will monitor and estimate the communications stream by analyzing the semantic content of both the communications stream received from the caller $C_1$ and the agent $A_1$. It will be clear to those skilled in the art, after reading this disclosure, how to make and use alternative embodiments of the present invention in which the call-processing switch 104 only monitors and estimates a level of distress of one communications stream, for example, either from the caller or the agent. Task 305 will be described in detail below with respect to FIG. 8.

At task 308, the call-processing switch 104 builds a model of the effectiveness of the first message and the second message in alleviating the distress of caller $C_1$ and agent $A_1$. This model will be used in future calls to assist call-processing switch 104 in choosing which messages to display to a caller and an agent in analogous circumstances. It will be clear to those skilled in the art, after reading this disclosure, how to make and use alternative embodiments of the present invention in which the model is based on one or more estimated levels of distress.

Figure 4:
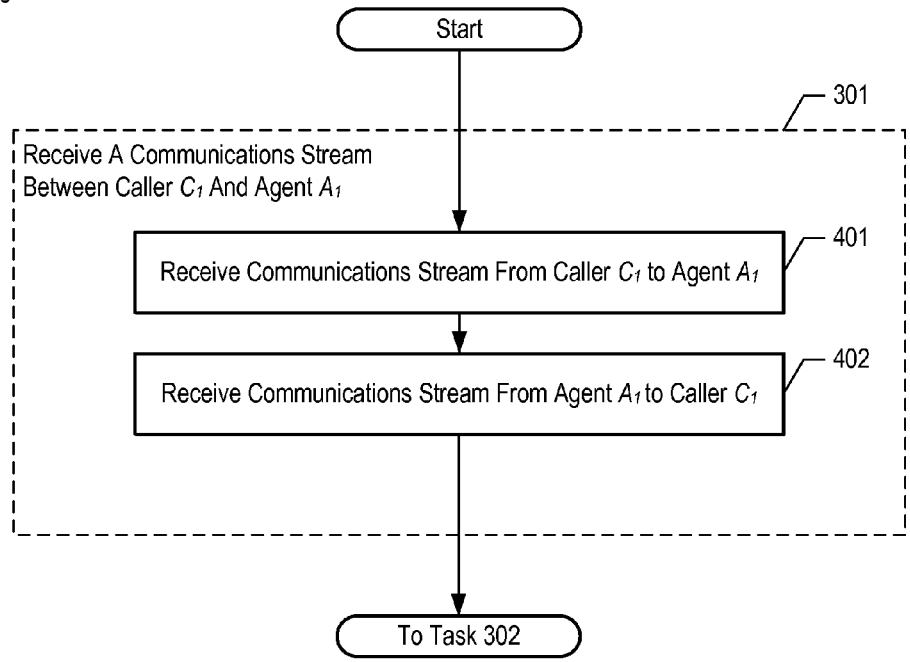
FIG. 4 depicts a flowchart of the salient tasks associated with the operation of task 301 in accordance with the illustrative embodiment of the present invention.

FIG. 4 depicts a flowchart of the salient tasks associated with the operation of task 301 in accordance with the illustrative embodiment of the present invention. It will be clear to those skilled in the art, after reading this disclosure, how to perform the tasks associated with FIG. 4 in a different order than represented or to perform one or more of the tasks concurrently. Furthermore, it will be clear to those skilled in the art, after reading this disclosure, how to make and use alternative embodiments of the present invention that omit one or more of the tasks associated with FIG. 4.

At task 401, the call-processing switch 104 receives communications signals from caller $C_1$ to agent $A_1$. In accordance with the illustrative embodiment, the communications stream received from caller $C_1$ to agent $A_1$ are in the form of audio signals.

At task 402, the call-processing switch 104 receives communications signals from agent $A_1$ to caller $C_1$. In accordance with the illustrative embodiment, the communications stream received from agent $A_1$ to caller $C_1$ are also in the form of audio signals.

It will be clear to those skilled in the art, after reading this disclosure, how to make and use alternative embodiments of the present invention in which the communications stream received by call-processing switch 104 could be in the form of:

i. voice, or
 ii. text, or
 iii. data, or
 iv. video, or
 v. any combination of i, ii, iii, and iv.

Furthermore, it will be clear to those skilled in the art, after reading this disclosure, how to make and use alternative embodiments of the present invention in which the present invention omits one of the task 401 and 402.

Figure 5:
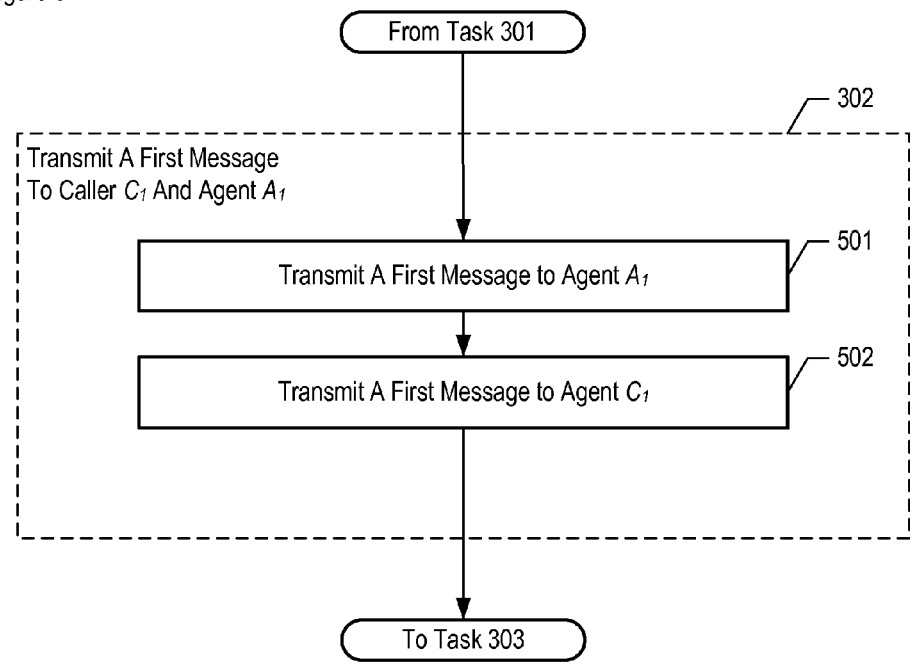
FIG. 5 depicts a flowchart of the salient tasks associated with the operation of task 302 in accordance with the illustrative embodiment of the present invention.

FIG. 5 depicts a flowchart of the salient tasks associated with the operation of task 302 in accordance with the illustrative embodiment of the present invention. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks associated with FIG. 5.

At task 501 and 502, the call-processing switch 104 transmits a first message to agent $A_1$ and caller $C_1$. In accordance with the illustrative embodiment, call-processing switch 104 selects the first message from a plurality of messages based, at least in part, on:
- i. a model of the likelihood that each of the plurality of messages will assist caller $C_i$, or
- ii. an analysis of the communications stream, or
- iii. any combination of i and ii.

It will be clear to those skilled in the art, after reading this disclosure, how to make and use alternative embodiments of the present invention in which the first message is transmitted only to one terminal, for example, either the caller terminal or the agent terminal.

Furthermore, it will be clear to those skilled in the art, after reading this disclosure, how to make and use alternative embodiments of the invention in which the first message is presented to the caller and agent, for example, and without limitation, via a user interface, e-mail, voice, etc.

Figure 6:
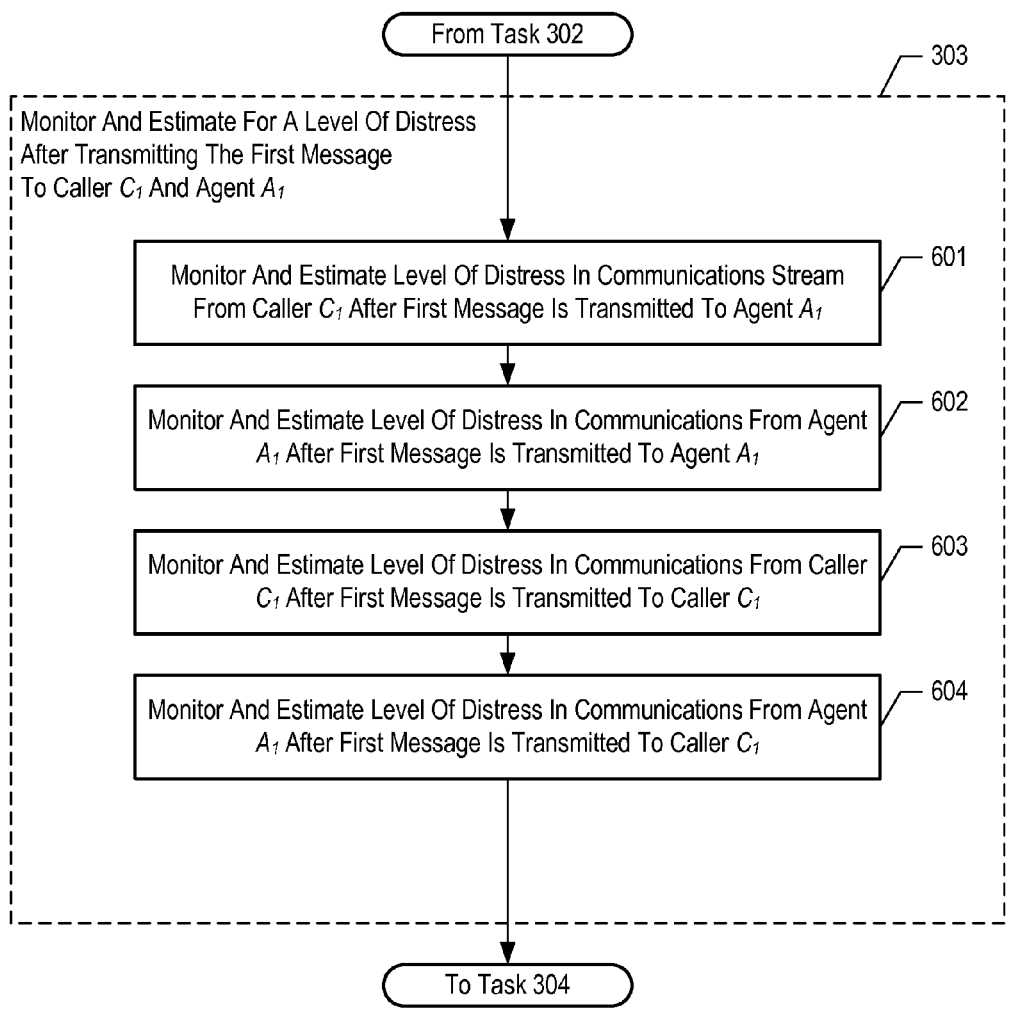
FIG. 6 depicts a flowchart of the salient tasks associated with the operation of task 304 in accordance with the illustrative embodiment of the present invention.

FIG. 6 depicts a flowchart of the salient tasks associated with the operation of task 303 in accordance with the illustrative embodiment of the present invention. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks associated with FIG. 6.

At task 601, the call-processing switch 104 monitors and estimates whether a level of distress is present in the communications stream from caller $C_1$ after the first message is presented to agent $A_1$. In accordance with the illustrative embodiment, the call-processing switch 104 monitors and estimates whether a level of distress is present by analyzing the semantic contents of the communications stream, for example, and without limitation, monitoring and estimating the acoustic features of the communications stream from caller $C_1$. These acoustic features include, but are not limited to:
- i. the choice of words and phrases in the communication stream, or
- ii. the temporal ratio of speaking to silence in the communications stream, or
- iii. the phonetic emphasis on words and phrases in the communications stream, or
- iv. the temporal rate of speech, and its temporal derivatives, in the communications stream, or
- v. the tone (e.g., level of formality, informality, sarcasm, etc.) of speech in the communications speech, or
- vi. any combination of i, ii, iii, iv, and v.

It will be clear to those skilled in the art, after reading this disclosure, how to make and use alternative embodiments of the present invention in which the call-processing switch 104 is configured to monitor and estimate whether a level of distress is present in the communications stream by analyzing:
- i. text (e.g., capitalizing all the letters in an instant message or e-mail, punctuation marks, etc.), or
- ii. facial expressions (e.g., lowering of the eyebrows during a video conference, etc.), or
- iii. gesticulations, (e.g., slamming his/her hand on the table, etc.) or
- iv. voice, (providing more emphasis on a word, phrase or sentence during a voice conference, etc.) or
- v. any combination of i, ii, iii, and iv.

At task 602, the call-processing switch 104 monitors and estimates whether a level of distress is present in the communications stream from agent $A_1$ after the first message is presented to agent $A_1$.

At task 603, the call-processing switch 104 monitors and estimates whether a level of distress is present in the communications stream from caller $C_1$ after the first message is presented to caller $C_1$.

At task 604, the call-processing switch 104 monitors and estimates whether a level of distress is present in the communications stream from agent $A_1$ after the first message is presented to caller $C_1$.

It will be clear to those skilled in the art, after reading this disclosure, how to make and use alternative embodiments of the present invention in which call-processing switch 104 only performs some of the tasks associated with FIG. 6.

Figure 7:
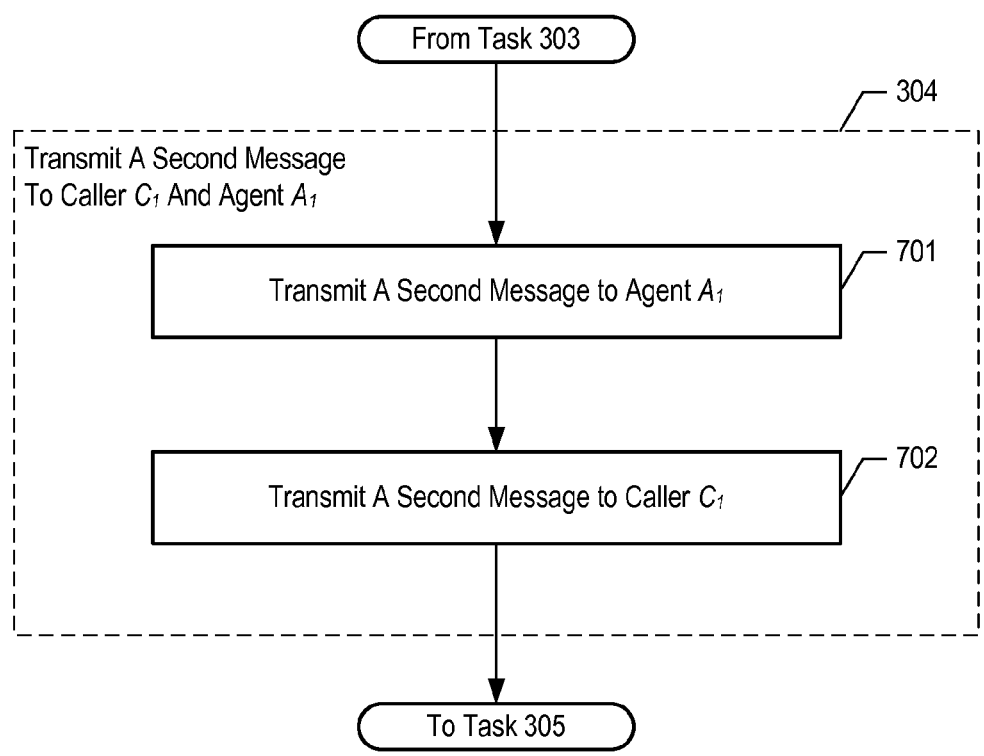
FIG. 7 depicts a flowchart of the salient tasks associated with the operation of task 305 in accordance with the illustrative embodiment of the present invention.

FIG. 7 depicts a flowchart of the salient tasks associated with the operation of task 304 in accordance with the illustrative embodiment of the present invention. It will be clear to those skilled in the art, after reading this disclosure, how to perform the tasks associated with FIG. 7 in a different order than represented or to perform one or more of the tasks concurrently. Furthermore, it will be clear to those skilled in the art, after reading this disclosure, how to make and use alternative embodiments of the present invention that omit one or more of the tasks associated with FIG. 7.

In accordance with the illustrative embodiment, the call-processing switch 104 estimated that there is a level of distress present in the communications stream after transmitting the first message to the caller and the agent.

At task 701 and 702, the call-processing switch 104 transmits a second message to agent $A_1$ and caller $C_1$. In accordance with the illustrative embodiment, call-processing switch 104 selects the second message from a plurality of messages based, at least in part, on:
- i. a model of the likelihood that each of the plurality of messages will assist caller $C_i$, or
- ii. an analysis of the communications stream, or
- iii. any combination of i and ii.

It will be clear to those skilled in the art, after reading this disclosure, how to make and use alternative embodiments of the present invention in which the second message is transmitted only to one terminal, for example, the caller terminal or the agent terminal.

Furthermore, it will be clear to those skilled in the art, after reading this disclosure, how to make and use alternative embodiments of the invention in which the second message is presented to the caller and agent, for example, and without limitation, via a user interface, e-mail, voice, etc.

Figure 8:
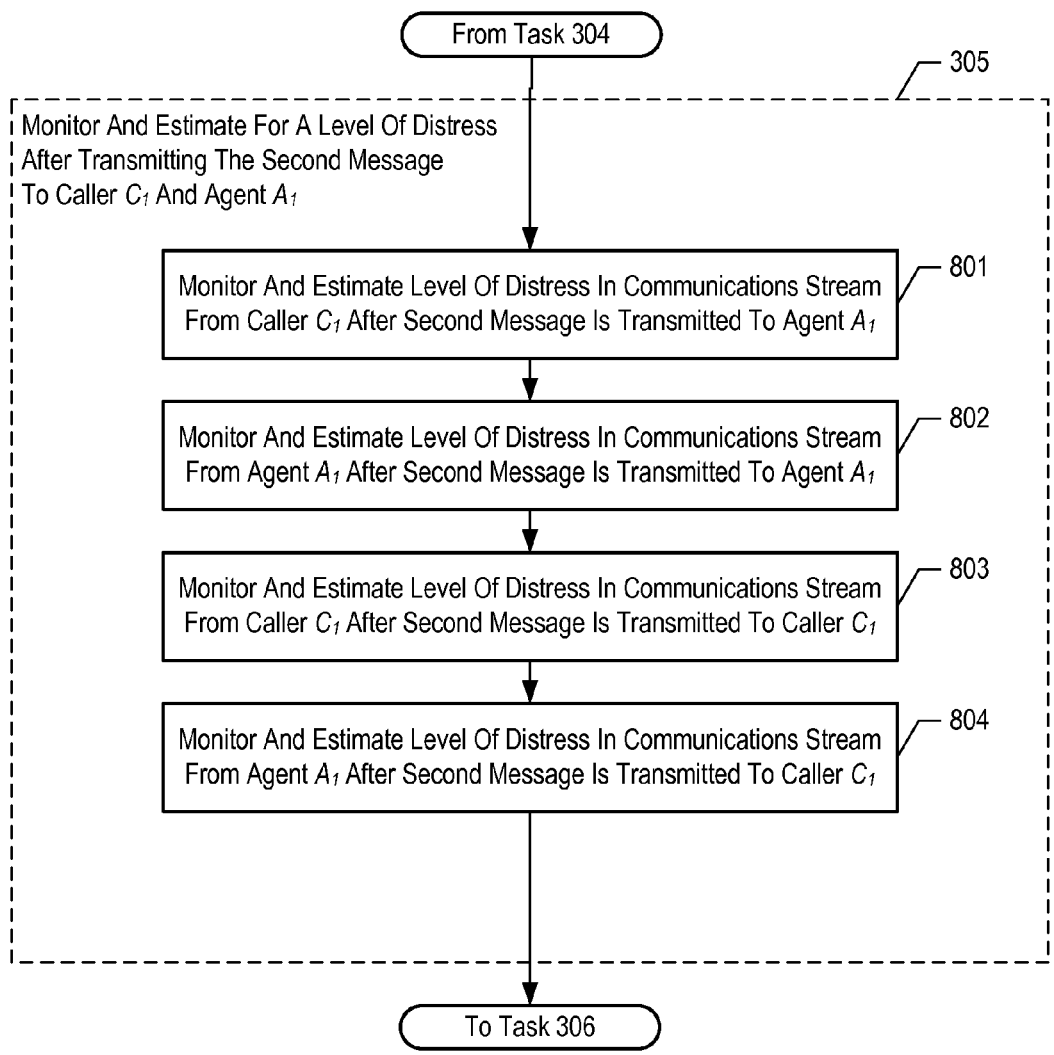
FIG. 8 depicts a flowchart of the salient tasks associated with the operation of task 307 in accordance with the illustrative embodiment of the present invention.

FIG. 8 depicts a flowchart of the salient tasks associated with the operation of task 305 in accordance with the illustrative embodiment of the present invention. It will be clear to those skilled in the art, after reading this disclosure, how to perform the tasks associated with FIG. 8 in a different order than represented or to perform one or more of the tasks concurrently. Furthermore, it will be clear to those skilled in the art, after reading this disclosure, how to make and use alternative embodiments of the present invention that omit one or more of the tasks associated with FIG. 8.

At task 801, the call-processing switch 104 monitors and estimates whether a level of distress is present in the communications stream from caller $C_1$ after the second message is transmitted to agent $A_1$. In accordance with the illustrative embodiment, the call-processing switch 104 monitors and estimates whether distress is present by analyzing the semantic contents of the communications stream, for example, and without limitation, monitoring and estimating the acoustic features of the communications stream from caller $C_1$. These acoustic features include, but are not limited to:

i. the choice of words and phrases in the communication stream, or ii. the temporal ratio of speaking to silence in the communications stream, or iii. the phonetic emphasis on words and phrases in the communications stream, or iv. the temporal rate of speech, and its temporal derivatives, in the communications stream, or v. the tone (e.g., level of formality, informality, sarcasm, etc.) of speech in the communications speech, or vi. any combination of i, ii, iii, iv, and v.

It will be clear to those skilled in the art, after reading this disclosure, how to make and use alternative embodiments of the present invention in which the call-processing switch 104 is configured to monitor and estimate whether distress is present in the communications stream by analyzing:

i. text (e.g., capitalizing all the letters in an instant message or e-mail, punctuation marks, etc.), or ii. facial expressions (e.g., lowering of the eyebrows during a video conference, etc.), or iii. gesticulations, (e.g., slamming his/her hand on the table, etc.) or iv. voice, (providing more emphasis on a word, phrase or sentence during a voice conference, etc.) or v. any combination of i, ii, iii, and iv.

At task 802, the call-processing switch 104 monitors and estimates whether a level of distress is present in the communications stream from agent $A_1$ after the second message is presented to agent $A_1$.

At task 803, the call-processing switch 104 monitors and estimates whether a level of distress is present in the communications stream from caller $C_1$ after the second message is presented to caller $C_1$.

At task 804, the call-processing switch 104 monitors and estimates whether a level of distress is present in the communications stream from agent $A_1$ after the second message is presented to caller $C_1$.

It will be clear to those skilled in the art, after reading this disclosure, how to make and use alternative embodiments of the present invention in which call-processing switch 104 only performs some of the tasks associated with FIG. 6.

Figure 9:
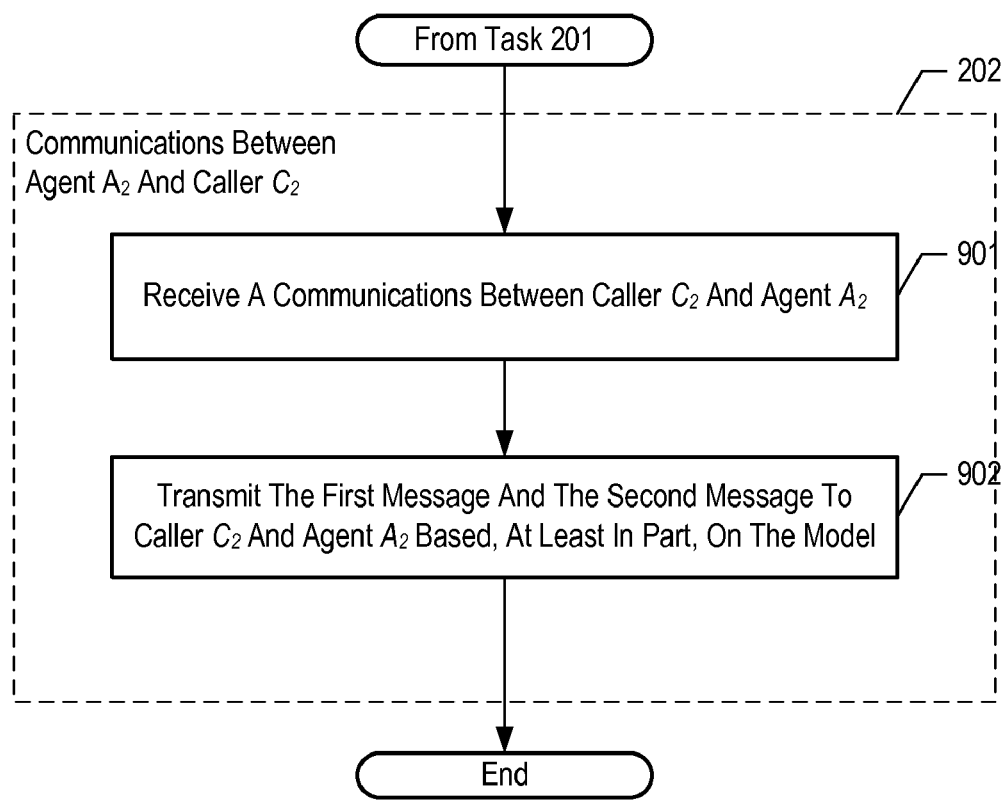
FIG. 9 depicts a flowchart of the salient tasks associated with the operation of task 202 in accordance with the illustrative embodiment of the present invention.

FIG. 9 depicts a flowchart of the salient tasks associated with the operation of task 202 in accordance with the illustrative embodiment of the present invention. It will be clear to those skilled in the art, after reading this disclosure, how to perform the tasks associated with FIG. 9 in a different order than represented or to perform one or more of the tasks concurrently. Furthermore, it will be clear to those skilled in the art, after reading this disclosure, how to make and use alternative embodiments of the present invention that omit one or more of the tasks associated with FIG. 9.

At task 901, the call-processing switch 104 receives a communications stream between caller $C_2$ and agent $A_2$. In accordance with the illustrative embodiment, agent $A_2$ is presented with analogous circumstances as agent $A_1$.

At task 902, the call-processing switch 104 will transmit the first message and the second message to agent $A_2$ in an order based, at least in part, on the first level of distress and the second level of distress, i.e., the model based on the estimated levels of distress at task 306.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
    receiving a communication stream from a first caller $C_1$ for a first agent $A_1$;
    transmitting a first message to the first agent $A_1$;
    estimating a first level of distress in the first caller $C_1$ after the first message is presented to the first agent $A_1$ by analyzing the semantic content of the communication stream from the first caller $C_1$ to the first agent $A_1$;
    transmitting a second message to the first agent $A_1$;
    estimating a second level of distress in the first caller $C_1$ after the second message is presented to the first agent $A_1$ by analyzing the semantic content of the communication stream from the first caller $C_1$ for the first agent $A_1$; and
    transmitting the first message and the second message to a second agent $A_2$ in an order based, at least in part, on the first level of distress and the second level of distress.

2. The method of claim 1 wherein the order is also based, at least in part, on the semantic content of the communication stream from the first caller $C_1$ for the first agent $A_1$.

3. The method of claim 1 further comprising:
    receiving a communication stream from the first agent $A_1$ to the first caller $C_1$;
    estimating a third level of distress in the first agent $A_1$ after the first message is presented to the first agent $A_1$ by analyzing the semantic content of the communication stream from the first agent $A_1$ to the first caller $C_1$;
    estimating a fourth level of distress in the first agent $A_1$ after the second message is presented to first agent $A_1$ by analyzing the semantic content of the communication stream from the first agent $A_1$ to the first caller $C_1$; and
    wherein the order is also based, at least in part, on the third level of distress and the fourth level of distress.

4. The method of claim 3 wherein the order is also based, at least in part, on the semantic content of the communication stream from the first agent $A_1$ to the first caller $C_1$.

5. The method of claim 1 further comprising:
    transmitting the first message to the first caller $C_1$;
    estimating a third level of distress in the first caller $C_1$ after the first message is presented to the first caller $C_1$ by analyzing the semantic content of the communication stream from the first caller $C_1$ for the first agent $A_1$;
    transmitting the second message to the first caller $C_1$; and
    estimating a fourth level of distress in the first agent $A_1$ after the second message is presented to the first caller $C_1$ by analyzing the semantic content of the communication stream from the first caller $C_1$ for the first agent $A_1$;
    wherein the order is also based on the third level of distress and the fourth level of distress.

6. A method comprising:
    receiving a communication stream from agent $A_1$ to caller $C_1$;
    transmitting a first message to agent $A_1$;
    estimating a first level of distress in the communication stream from agent $A_1$ after the first message is presented to agent $A_1$;
    transmitting a second message to agent $A_1$;
    estimating a second level of distress in the communication stream from agent $A_1$ after the second message is presented to agent $A_1$;
    transmitting the first message and the second message to agent $A_2$ in an order based, at least in part, on the first level of distress and the second level of distress.

7. The method of claim 6 wherein the order is also based on keywords in a communication stream from agent $A_1$ to caller $C_1$.

8. The method of claim 6 further comprising:
receiving a communication stream from caller $C_1$ for agent $A_1$;
estimating a third level of distress in the communication stream from caller $C_1$ after the first message is presented to agent $A_1$;
estimating a fourth level of distress in the communication stream from caller $C_1$ after the second message is presented to agent $A_1$;
wherein the order is also based on the third level of distress and the fourth level of distress.

9. The method of claim 8 wherein the order is also based on keywords in a communication stream from caller $C_1$ for agent $A_1$.

10. The method of claim 6 further comprising:
transmitting a first message to caller $C_1$;
estimating a third level of distress in the communication stream from caller $C_1$ after the first message is presented to caller $C_1$;
transmitting a second message to caller $C_1$;
estimating a fourth level of distress in the communication stream from caller $C_1$ after the second message is presented to caller $C_1$;
wherein the order is also based on the third level of distress and the fourth level of distress.

11. A method comprising:
receiving a communication stream from caller $C_1$ for agent $A_1$;
transmitting a first message to caller $C_1$;
estimating a first level of distress in the communication stream from caller $C_1$ after the first message is presented to caller $C_1$;
transmitting a second message to caller $C_1$;
estimating a second level of distress in the communication stream from caller $C_1$ after the second message is presented to caller $C_1$;
transmitting the first message and the second message to agent $A_2$ in an order based, at least in part, on the first level of distress and the second level of distress.

12. The method of claim 11 wherein the order is also based on keywords in a communication stream from caller $C_1$ for agent $A_1$.

13. The method of claim 11 further comprising:
receiving a communication stream from agent $A_1$ to caller $C_1$;
estimating a third level of distress in the communication stream from agent $A_1$ after the first message is presented to caller $C_1$;
estimating a fourth level of distress in the communication stream from agent $A_1$ after the second message is presented to caller $C_1$;
wherein the order is also based on the third level of distress and the fourth level of distress.

14. The method of claim 13 wherein the order is also based on keywords in a communication stream from agent $A_1$ to caller $C_1$.

15. The method of claim 11 further comprising:
transmitting a first message to agent $A_1$;
estimating a third level of distress in the communication stream from caller $C_1$ after the first message is presented to agent $A_1$;
transmitting a second message to agent $A_1$;
estimating a fourth level of distress in the communication stream from caller $C_1$ after the second message is presented to agent $A_1$;
wherein the order is also based on the third level of distress and the fourth level of distress.

16. A method comprising:
receiving a communication stream from agent $A_1$ to caller $C_1$;
transmitting a first message to caller $C_1$;
estimating a first level of distress in the communication stream from agent $A_1$ after the first message is presented to caller $C_1$;
transmitting a second message to caller $C_1$;
estimating a second level of distress in the communication stream from agent $A_1$ after the second message is presented to caller $C_1$;
transmitting the first message and the second message to agent $A_2$ in an order based, at least in part, on the first level of distress and the second level of distress.

17. The method of claim 16 wherein the order is also based on keywords in a communication stream from agent $A_1$ to caller $C_1$.

18. The method of claim 16 further comprising:
receiving a communication stream from caller $C_1$ for agent $A_1$;
estimating a third level of distress in the communication stream from caller $C_1$ after the first message is presented to caller $C_1$;
estimating a fourth level of distress in the communication stream from caller $C_1$ after the second message is presented to caller $C_1$;
wherein the order is also based on the third level of distress and the fourth level of distress.

19. The method of claim 18 wherein the order is also based on keywords in a communication stream from caller $C_1$ for agent $A_1$.

20. The method of claim 16 further comprising:
transmitting a first message to agent $A_1$;
estimating a third level of distress in the communication stream from caller $C_1$ after the first message is presented to agent $A_1$;
transmitting a second message to agent $A_1$;
estimating a fourth level of distress in the communication stream from caller $C_1$ after the second message is presented to agent $A_1$;
wherein the order is also based on the third level of distress and the fourth level of distress.

* * * * *